United States Patent Office 3,103,092
Patented Sept. 10, 1963

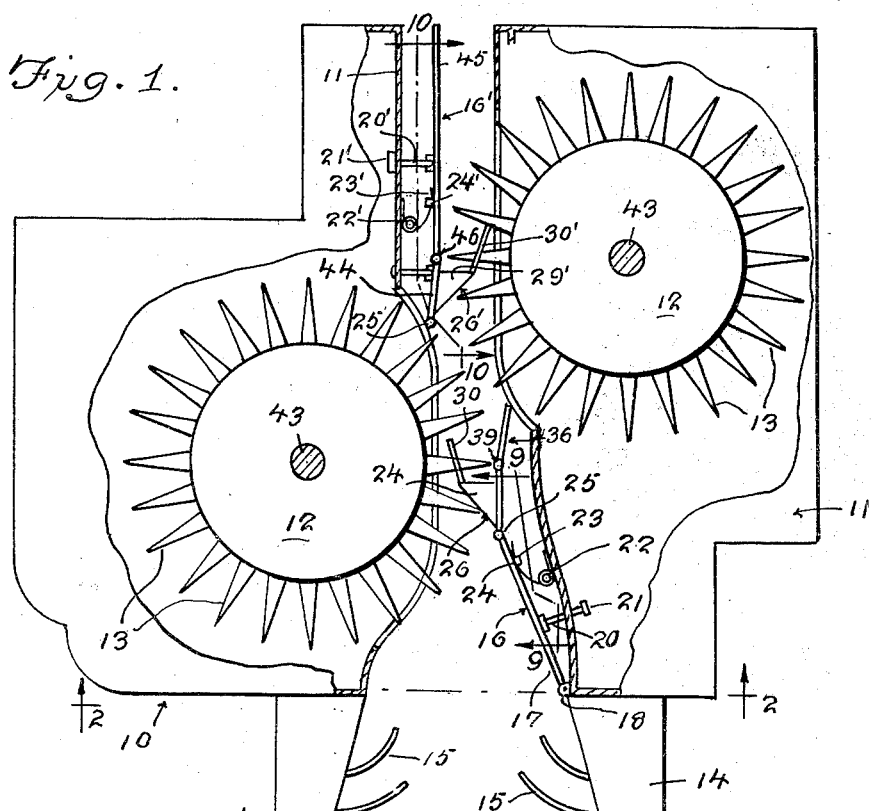
Fig. 1.
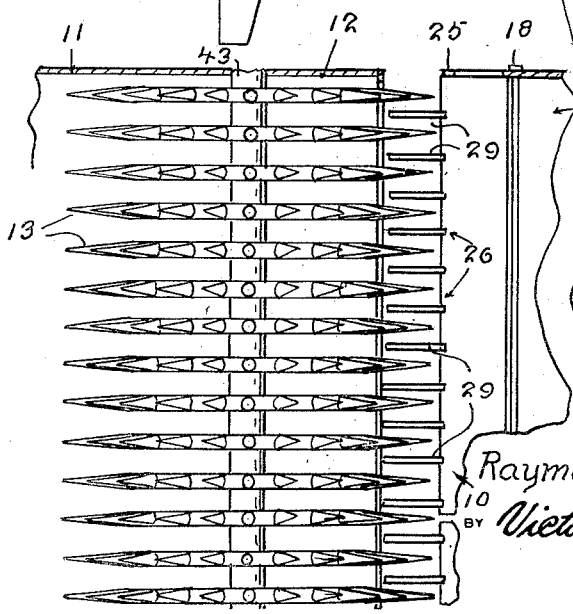
Fig. 2.
Fig. 9.
INVENTOR.
Raymond E. Templeton
BY Victor J. Evans & Co.
ATTORNEYS

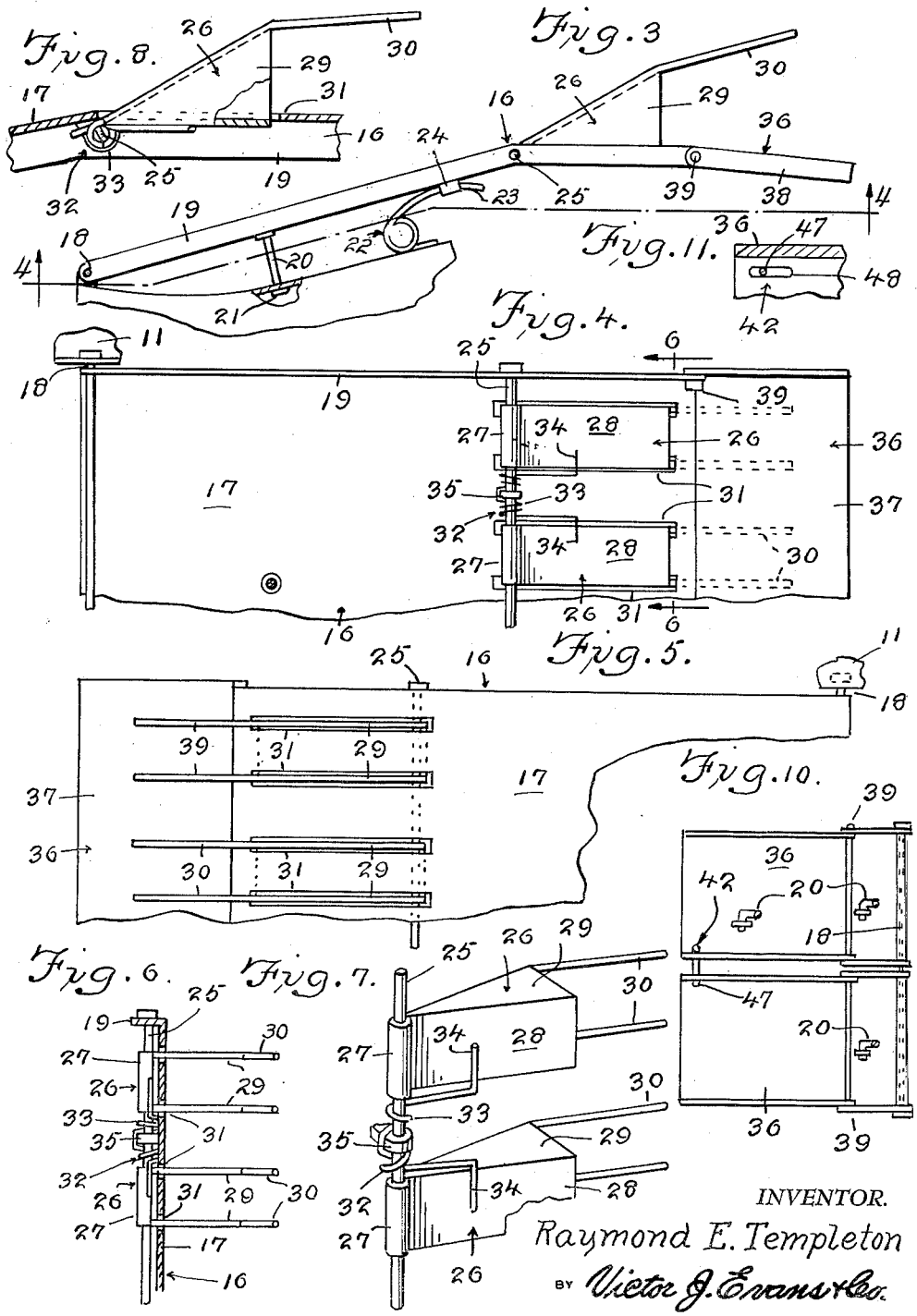

3,103,092
COTTON PICKER
Raymond E. Templeton, Rte. 2, Box 766, Peoria, Ariz.
Filed Mar. 29, 1960, Ser. No. 18,380
3 Claims. (Cl. 56—44)

This invention relates to agricultural equipment, and more particularly to a cotton picking machine.

The object of the invention is to provide a cotton picker which includes improved pressure plates which will permit cotton fibers to be picked with a greater efficiency.

Another object of the invention is to provide a cotton picker which includes improved pressure plates which will provide an even pressure and holding action throughout its entire length so as to pick all ripe and opened boles without harming or damaging inmature plants.

A further object of the invention is to provide pressure plates for a cotton picker which are simple and easy to install or repair and wherein the pressure plates have movable parts so that the exact and proper amount of pressure will be applied for each picking spindle so that all of the cotton boles will be brought into position to be picked.

A further object of the invention is to provide a cotton picker which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a plan view illustrating a portion of a cotton picking machine and showing the pressure plates of the present invention thereon, and with parts broken away and in section.

FIGURE 2 is a sectional view taken on line 2—2 of FIGURE 1.

FIGURE 3 is a plan view showing one of the pressure plates on an enlarged scale.

FIGURE 4 is a sectional view taken on the line 4—4 of FIGURE 3.

FIGURE 5 is a view illustrating certain constructional details of the present invention.

FIGURE 6 is a sectional view taken on line 6—6 of FIGURE 4.

FIGURE 7 is a fragmentary perspective view showing the support members and their associated parts.

FIGURE 8 is a fragmentary sectional view illustrating the mounting for the support members.

FIGURE 9 is a sectional view taken on the line 9—9 of FIGURE 1.

FIGURE 10 is a sectional view taken on the line 10—10 of FIGURE 1.

FIGURE 11 is a fragmentary view partly in section showing the slide hinge.

Referring in detail to the drawings, the numeral 10 indicates a portion of a cotton picking machine, FIGURE 1, and this machine 10 includes a frame 11 as well as the usual drums 12, and extending from each drum 12 is a plurality of spaced apart spindles 13. Arranged on the front of the machine are guides 14 which are provided with the usual fingers 15.

According to the present invention there is provided spaced apart front and rear pressure plates 16 and 16', respectively, with at least two plates 16 and at least two plates 16' arranged in superimposed relation. The plates 16 being identical to each other and the plates 16' also being identical to each other. Each of the front pressure plates 16 includes a main body portion 17 which is hingedly or pivotally connected to an adjacent portion of the frame 11 as at 18. The main body portion 17 is provided with spaced apart flanges 19. As shown in FIGURE 3 for example, a limit stop member or bolt 20 has one end secured to the body portion 17, and the member 20 extends through a suitable opening in the frame and has a stop nut 21 thereon so as to limit swinging or pivotal movement of the plate 16 on the pivot pin 18. The plate 16 is normally urged or biased in a counter clockwise direction, FIGURE 3, by means of a resilient means or spring 22 which is interposed between the frame and plate. The spring 22 includes an end portion 23 which is held in place between lugs 24 on the pressure plate.

Extending through the flanges 19 of the main body portion 17 is a rod 25, and the numeral 26 designates each of a plurality of spaced apart bases or support members which have a rolled or coiled portion 27 hingedly or pivotally mounted on the rod 25, FIGURE 7. Each of the support members 26 includes a back wall 28 as well as a pair of spaced apart parallel triangular side walls 29. A pair of spaced apart arm 30 extend from each support member 26 for a purpose to be later described. The main body portion 17 is provided with slots or cutouts 31 and the side walls 29 are mounted for slidable movement through the slots 31. The numeral 32 indicates each of a plurality of spring members which are arranged as shown in the drawings. Each of the spring members 32 include an intermediate coil portion 33 which is mounted on the rod 25, and each spring member 32 further includes diametrically opposed end sections 34 which engage the back walls 28 of the support members 26 for normally urging or biasing the support members in the proper direction. Keepers or dogs 35 on the rod 25 are engaged by the intermediate portions 33 of the spring members 32.

A flap 36 is hingedly connected to each of the main body portions 17, and the flap 36 includes a portion 37 which has flanges 38 that are pivotally connected to the flanges 19 by means of a pivot pin or securing element 39, FIGURE 4.

As shown in FIGURE 9, each of the pressure plates 16 includes upper and lower sections 40 and 41.

In FIGURE 1 it will be seen that the rear pressure plate 16' has a front section 44 and a rear section 45 pivotally connected to the front section 44 at 46. The front section 44 is pivotally connected to the frame 11 by a pivot pin 25'.

A stop bolt 20' is provided and a nut 21' on the bolt 20' limits the swinging movement of the section 45, and another stop bolt 20" limits the swinging movement of the section 44.

A spring 22' having an end portion 23' secured between lugs 24' on the plate section 45 biases the section 45 outwardly of the frame 11. A support member 26', including side walls 29' and arms 30', is pivotally connected to the rod 25' in the same manner as the member 26 is connected to the rod 25, as previously described.

FIGURE 1 illustrates the front of the machine, and it will be seen that there are pressure plates provided and these pressure plates in the front are made up of three sections, and the first section is a stop to eliminate outward movement thereof. The second section is made of or includes the fingers 30 as well as the side plates 29, and bottom plates 28, and these are held forward by the springs 32. The back plate is made in two sections, and the first section has the fingers and side plates 26 as well as the bottom element 28. The first section is pivoted to the frame as at 25, and the first section is a limit stop on it, and the second section has a spring which pushes it out. The number of the pressure plates can be varied as desired or required, and due to the provision of the different number of sections at the top, the pressure plates can properly function. The springs 23 are mounted on one rod, and this rod causes the springs to keep the parts properly positioned out.

The numeral 43 indicates the shafts for the drums 12.

From the foregoing, it is apparent that there has been provided an improved cotton picker which includes pressure plates that will co-act with the spindle drums 12 to insure that the cotton will be properly picked and handled.

In use, as the machine 10 moves along the field of growing cotton, the stalks are guided into place between the guide members 14 and the stalks will be first acted on by the front spindles 13 on the drums 12 in coaction with the adjacent pressure plates 16. Then, the stalks will be acted on by the spindles on the rear drum 12 together with each coacting pressure plate 16′.

The present invention is especially suitable for picking cotton fibers and it will pick cleaner fiber without waste and it will prevent harm to inmature plants. One of the important disadvantages of cotton pickers that are now in use is that such machines are provided with a one piece smooth vertical pressure plate which forces the cotton plant into the picking spindles and this type of pressure plate only holds the cotton plant at the strongest point of pressure which in this case is close to the ground where the plant limbs are larger and less flexible. This causes the top part of the cotton plant, where the greatest portion of fiber is grown, to be loose in the machine and it shakes out of the burrs and would naturally be loose and fall to the ground and with total loss to the owner.

Another important disadvantage in conventional machines is the stripper bar which is in use on pressure plates today. They are fastened to the front of the plates in one solid unit, forming an obstacle that bruises and pulls off unripened fruit. When the stalks are dry, this obstacle also tends to break up small limbs and causes trash that stays in the lint, causing a much lower grade of fiber and inferior quality.

According to the present invention there is provided a flexible pressure plate which will provide an even pressure and holding action throughout its entire length so as to pick all ripe and opened boles without harm or damage to immature plants and there is provided arms 30 for each row of picking spindles that move in and out between the spindles under the right amount of pressure so as to bring all the cotton boles in position to be picked. There is also provided two vertical pressure plates that work separately and when the plant foliage is heavy at the bottom, the bottom plate swings out leaving the top plate against the plant. The pressure plates are simple and easy to install or repair and permit the machine to operate efficiently and advantageously.

In FIGURES 10 and 11 the numeral 42 indicates a slide hinge which serves to hold the two adjacent flaps 36 of the forward pressure plates 16 together. The hinge 42 comprises a pin 47 slidable in a slotted hole 48 formed in each of the side portions of the flaps 36. This permits both the top and the bottom portions to move separately.

Minor changes in shape, size and rearrangement of details coming within the field of invention claimed, may be resorted to in actual practice, if desired.

What is claimed is:

1. In a cotton picker, a frame, a pair of spaced apart drums mounted in said frame, a plurality of spaced apart spindles mounted on each of said drums, front and rear pressure plates for coaction with said spindles; said plates comprising portions hingedly connected together, stop members extending between the plates and frame, resilient members interposed between the plates and frame, rods extending through portions of the plates, a plurality of spaced apart support members each having a hinge portion pivotally connected to a corresponding rod; each of said support members comprising a back wall and spaced parallel triangular shaped side walls, a pair of spaced parallel arms positioned contiguous to each support member, said plates being provided with slots for the slidable projection therethrough of said side walls, a spring member having an intermediate coil portion mounted on the rod, said spring member further including diametrically opposed end sections engaging the back walls of the support members.

2. In a cotton picker, a frame, a pair of spaced apart drums mounted in said frame, a plurality of spaced apart spindles mounted on each of said drums, front and rear pressure plates for coaction with said spindles; said plates comprising portions hingedly connected together, stop members extending between the plates and frame, resilient members interposed between the plates and frame, rods extending through portions of the plates, a plurality of spaced apart support members each having a hinge portion pivotally connected to a corresponding rod; each of said support members comprising a back wall and spaced parallel triangular shaped side walls, a pair of spaced parallel arms positioned contiguous to each support member, said plates being provided with slots for the slidable projection therethrough of said side walls, a spring member having an intermediate coil portion mounted on the rod, said spring member further including diametrically opposed end sections engaging the back walls of the support member, and a keeper on the rod for engagement with the intermediate coil portion.

3. The structure as defined in claim 2 wherein said plates each include upper and lower sections.

References Cited in the file of this patent

UNITED STATES PATENTS

| | | |
|---|---|---|
| 2,025,514 | Johnston | Dec. 24, 1935 |
| 2,140,631 | Johnston | Dec. 20, 1938 |
| 2,644,286 | Nisbet | July 7, 1953 |
| 2,830,427 | Odom | Apr. 15, 1958 |
| 3,030,757 | Hubbard | Apr. 24, 1962 |